US009994973B2

(12) United States Patent
Bieser et al.

(10) Patent No.: US 9,994,973 B2
(45) Date of Patent: *Jun. 12, 2018

(54) FIBERS AND NONWOVENS WITH IMPROVED MECHANICAL AND BONDING PROPERTIES

(75) Inventors: John Bieser, Houston, TX (US); Guillaume Pavy, Brussels (BE); Hugues Haubruge, Walhain (BE); Alain Standaert, Brussels (BE); William Rusty Wheat, Houston, TX (US)

(73) Assignee: Total Research & Technology Feluy, Seneffe, Feluy (BE)

( * ) Notice: Subject to any disclaimer, the term of this patent is extended or adjusted under 35 U.S.C. 154(b) by 1008 days.

This patent is subject to a terminal disclaimer.

(21) Appl. No.: 12/812,278

(22) PCT Filed: Feb. 19, 2009

(86) PCT No.: PCT/EP2009/051949
§ 371 (c)(1),
(2), (4) Date: Dec. 13, 2010

(87) PCT Pub. No.: WO2009/103750
PCT Pub. Date: Aug. 27, 2009

(65) Prior Publication Data
US 2011/0081818 A1  Apr. 7, 2011

Related U.S. Application Data

(60) Provisional application No. 61/029,632, filed on Feb. 19, 2008.

(30) Foreign Application Priority Data

Apr. 29, 2008 (EP) .................... 08155382

(51) Int. Cl.
*D04H 3/16* (2006.01)
*D04H 13/00* (2006.01)
*D01D 5/12* (2006.01)
*D01F 8/06* (2006.01)
*B32B 38/00* (2006.01)
*C08F 210/06* (2006.01)
*D01F 6/06* (2006.01)
*B32B 27/32* (2006.01)
*D01F 6/30* (2006.01)
*B32B 5/02* (2006.01)
*B32B 5/08* (2006.01)
*B32B 5/26* (2006.01)
*B32B 27/12* (2006.01)
*D04H 3/007* (2012.01)

(52) U.S. Cl.
CPC .............. *D01F 6/06* (2013.01); *B32B 5/022* (2013.01); *B32B 5/08* (2013.01); *B32B 5/26* (2013.01); *B32B 27/12* (2013.01); *B32B 27/32* (2013.01); *D01F 6/30* (2013.01); *D01F 8/06* (2013.01); *D04H 3/007* (2013.01); *B32B 2262/0253* (2013.01); *B32B 2262/12* (2013.01); *B32B 2307/50* (2013.01); *B32B 2307/54* (2013.01); *B32B 2307/724* (2013.01); *B32B 2419/00* (2013.01); *B32B 2471/02* (2013.01); *B32B 2555/00* (2013.01); *B32B 2571/00* (2013.01); *Y10T 442/60* (2015.04); *Y10T 442/681* (2015.04)

(58) Field of Classification Search
None
See application file for complete search history.

(56) References Cited

U.S. PATENT DOCUMENTS

| 5,350,817 A | * | 9/1994 | Winter et al. ............ 526/119 |
| 5,366,786 A | * | 11/1994 | Connor ............ A41D 31/0016 428/171 |
| 5,529,845 A | * | 6/1996 | Branchesi ............ D01F 6/06 428/212 |
| 5,571,619 A | * | 11/1996 | McAlpin ............ C08F 210/06 428/364 |

(Continued)

FOREIGN PATENT DOCUMENTS

| EP | 0152701 A1 | 8/1985 |
| EP | 0 875 609 A2 | 11/1998 |

(Continued)

OTHER PUBLICATIONS

Machine translation of JP2001288221,Nakano et al. Oct. 2001.*
Machine translation of claims of JP2001288221,Nakano et al. Oct. 2001.*
Celanese Acetate LLC, Complete Textile Glossary, 2001.*
Jeon et al., "Maximum Rate of Crystallization and Morphology of Random Propylene Ethylene Copolymers as a Function of Comonomer Content up to 21 mol%", Macromolecules, vol. 41, pp. 95-108, 2008.*
Dahiya et al. "Melt Blown Technology", Apr. 2004.*
Spruiell et al. (The Influence of Isotacticity, Ethylene Comonomer Content, and Nucleating Agent Additions on the Structure and Properties of Melt-Spun Isotactic Polypropylene Filaments, Journal of Applied Polymer Science, vol. 62, pp. 1965-1975, 1996).*

(Continued)

Primary Examiner — Shawn Mckinnon
(74) Attorney, Agent, or Firm — Albert Shung

(57) ABSTRACT

The present invention relates to fibers, particularly to as-spun fibers, having improved properties, in particular improved bonding performance and mechanical properties. In particular, the present invention relates to fibers comprising a metallocene random copolymer of propylene and one or more comonomers, said metallocene random copolymer having a broader molecular weight distribution. The present invention further relates to nonwovens comprising such fibers and to a process for producing such fibers and nonwovens. The fibers and the nonwovens of the present invention are characterized by improved properties, in particular improved bonding performance and mechanical properties, when compared to the prior art fibers and nonwovens.

7 Claims, No Drawings

(56) References Cited

U.S. PATENT DOCUMENTS

| | | | |
|---|---|---|---|
| 5,726,103 A | | 3/1998 | Stahl et al. |
| 5,763,080 A | * | 6/1998 | Stahl et al. .................. 428/378 |
| 5,831,106 A | * | 11/1998 | Langhauser et al. ........... 556/11 |
| 5,939,341 A | * | 8/1999 | Brown ..................... B32B 5/26 428/903 |
| 5,993,964 A | * | 11/1999 | Nakajima ................ D01F 6/30 428/364 |
| 6,218,011 B1 | * | 4/2001 | Raetzsch ................. D01F 1/10 428/364 |
| 6,355,741 B1 | * | 3/2002 | Marechal .............. B01J 8/0005 526/348.2 |
| 6,365,689 B1 | * | 4/2002 | Ushioda ................. C08F 10/00 526/160 |
| 6,444,774 B1 | * | 9/2002 | Stahl ...................... C08L 23/10 442/401 |
| 6,878,790 B2 | * | 4/2005 | Preuschen et al. ........... 526/351 |
| 2003/0149199 A1 | * | 8/2003 | Schottek ................ C07F 17/00 526/126 |
| 2004/0054024 A1 | * | 3/2004 | Debras ...................... C08J 3/28 522/3 |
| 2006/0008643 A1 | * | 1/2006 | Lin ...................... C08K 5/0016 428/364 |
| 2006/0172647 A1 | * | 8/2006 | Mehta et al. ................. 442/327 |

FOREIGN PATENT DOCUMENTS

| | | |
|---|---|---|
| EP | 0875609 | 11/1998 |
| EP | 1279754 A2 | 1/2003 |
| EP | 1 964 948 A1 | 9/2008 |
| EP | 1964948 | 9/2008 |
| JP | 2001288221 * | 10/2001 |
| WO | 03102069 A1 | 12/2003 |
| WO | 2007/071496 A1 | 6/2007 |
| WO | WO 2007/071496 * | 6/2007 |
| WO | WO 2007071445 * | 6/2007 |

OTHER PUBLICATIONS

International Search Report and Written Opinion issued in PCT/EP2009/051949 dated Dec. 1, 2009 (14 pages).

Korean Office Action issued in Korean Application No. 2010-7018368 dated Jul. 11, 2012, and English translation thereof (10 pages).

F. Fourne, Synthetische Fasern, Carl Hanser Verlag, 1995, chapter 5.2.

B. C. Goswami et al., Textile Yarns, John Wiley & Sons, 1977, p. 371-376.

L. Resconi et al., Selectivity in Propene Polymerization with Metallocene Catalysts, Chem. Rev., 2000, 100, (4), pp. 1253-1345.

Blomenhofer et al., Designer Nucleating Agents for Polypropylene, Macromolecules 2005, 38, 3688-3695.

Razavi et al., The Geometry of the Site and its Relevance for Chain Migration and Stereospecificity, Macromol. Symp., vol. 89, pp. 345-367, 1995.

H. N. Cheng, 13C Nuclear Magnetic Resonance Characterization of poly(propylene) Prepared with Homogeneous Catalysts, J. Ewen, Makromol. Chem., vol. 190 (1989), pp. 1931-1940.

G. J. Ray et al. "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, 1977, p. 773-778.

* cited by examiner

FIBERS AND NONWOVENS WITH IMPROVED MECHANICAL AND BONDING PROPERTIES

CROSS-REFERENCE TO RELATED APPLICATIONS

This application claims the benefit of PCT/EP2009/051949, filed Feb. 19, 2009, which claims priority from EP 08155382.8, filed Apr. 29, 2008 and U.S. Pat. Appl. Ser. No. 61/029,632, filed Feb. 19, 2008.

FIELD OF THE INVENTION

The present invention relates to fibers, particularly to as-spun fibers, having improved properties, in particular improved bonding performance and mechanical properties. In particular, the present invention relates to fibers comprising a metallocene random copolymer of propylene and one or more comonomers, said metallocene random copolymer having a broader molecular weight distribution. The present invention further relates to nonwovens comprising such fibers and to a process for producing such fibers and nonwovens. The fibers and the nonwovens of the present invention are characterized by improved properties, in particular improved bonding performance and mechanical properties, when compared to the prior art fibers and nonwovens.

THE TECHNICAL PROBLEM AND THE PRIOR ART

The combination of mechanical and physical properties together with good processability has made polypropylene the material of choice for a large number of fiber and nonwoven applications, such as for construction and agricultural industries, sanitary and medical articles, carpets, textiles.

Polypropylenes can for example be produced by polymerization of propylene in presence of a Ziegler-Natta catalyst, i.e. transition metal coordination catalysts, specifically titanium halide containing catalysts. Such catalysts in general also contain internal electron donors. The so-called Ziegler-Natta polypropylenes give acceptable properties in fibers and nonwovens. However, for some applications, such as spunbonding or meltblowing, they need to be further modified, e.g. by visbreaking to narrow the molecular weight distribution.

More recently polypropylenes produced by metallocene-based catalytic systems, frequently referred to as metallocene polypropylenes, have become available. Metallocene polypropylenes, due to their intrinsically narrow molecular weight distribution ($M_w/M_n$) of around 2, can be used in e.g. spunbonding without further post-reactor modifications and in addition give improved mechanical properties in fibers and nonwovens.

For example, U.S. Pat. No. 5,726,103 discloses composite fabrics comprising a melt blown nonwoven layer and a spunbond nonwoven layer, with at least one of these layers being made from a metallocene polypropylene with Mw/Mn≤5 and a propylene tacticity of greater than 90 percent mmmm pentads. The metallocene polypropylene may be a copolymer comprising propylene and from about 0.2 mol % to about 6 mol % of at least one comonomer selected from the group consisting of 2 to 20 carbon atoms. The melting point of these polypropylene copolymers is in the range from 100° C. to 145° C.

EP-A-1 279 754 discloses drawn fibers comprising an isotactic copolymer of propylene and from 0.2 mol % to 10 mol % of at least one alpha-olefin, with said isotactic copolymer being produced in presence of a metallocene-based catalytic system. The fibers are prepared by drawing a melt spun preform at a draw speed of less than 2000 m/min and a draw ratio of at least 1.5. The fibers are further characterized by a tenacity of 3.5 g per denier or more.

However, none of the prior art documents takes account of the fact that the inherent narrow molecular weight distribution of the metallocene polypropylene influences the properties and in particular the bonding performance and the mechanical properties of fibers and nonwovens produced with such metallocene polypropylenes.

It is therefore an object of the present invention to provide fibers and nonwovens that are characterized by improved bonding performance.

It is another object of the present invention to provide fibers and nonwovens that are characterized by improved mechanical properties.

In particular it is an object of the present invention to provide fibers and nonwovens that are characterized by an improved balance between bonding performance and mechanical properties.

Further, it is an object of the present invention to provide such fibers and nonwovens that are characterized by good processability in their production and their use in the production of downstream products.

BRIEF DESCRIPTION OF THE INVENTION

We have now discovered that at least one of the above objectives can be met when the polypropylene used to make the fibers and nonwovens is a metallocene random copolymer, characterized in that the metallocene random copolymer has a minor amount of one or more comonomers and a broader molecular weight distribution than conventional metallocene polypropylene has.

The present invention therefore provides fibers comprising a metallocene random copolymer of propylene and one or more comonomers, said comonomers being alpha-olefins different from propylene, wherein said metallocene random copolymer has a comonomer content in the range from 0.1 wt % to 1.0 wt %, relative to the total weight of the metallocene random copolymer, and a molecular weight distribution $M_w/M_n$ of at least 2.5.

The present invention further provides nonwovens and hygiene articles made with such fibers.

The present invention also provides a process for the production of a spunbond nonwoven comprising the steps of
(a) providing a blend comprising a metallocene polypropylene,
(b) feeding the blend of step (a) to an extruder,
(c) subsequently melt-extruding the blend to obtain a molten polymer stream,
(d) extruding the molten polymer stream of step (c) from a number of fine, usually circular, capillaries of a spinneret, thus obtaining filaments of molten polymer, and
(e) subsequently rapidly reducing the diameter of the filaments obtained in the previous step to a final diameter, wherein the metallocene polypropylene in step (a) is a metallocene random copolymer of propylene and one or more comonomers, said comonomers being alpha-olefins different from propylene, wherein said metallocene random copolymer has a comonomer content in the range from 0.1 wt % to 1.0 wt %, relative to the total weight of the metallocene random copolymer, and a molecular weight distribution $M_w/M_n$ of at least 2.5.

Further, the present invention provides a process for the production of multicomponent fibers and filaments, said process comprising the steps of
- (a1) providing a first blend comprising a metallocene polypropylene,
- (a2) providing at least one further blend comprising a thermoplastic polymer,
- (b1) feeding each of the blends of steps (a1) and (a2) to a separate extruder,
- (c1) consecutively melt-extruding the blends to obtain a molten polymer stream for each blend,
- (d1) co-extruding the molten polymer streams of step (c1) from a number of fine capillaries of a spinneret, thus obtaining multicomponent filaments of molten polymer, and
- (e) subsequently rapidly reducing the diameter of the filaments obtained in the previous step to a final diameter, wherein the metallocene polypropylene in step (a1) is a metallocene random copolymer of propylene and one or more comonomers, said comonomers being alpha-olefins different from propylene, wherein said metallocene random copolymer has a comonomer content in the range from 0.1 wt % to 1.0 wt %, relative to the total weight of the metallocene random copolymer, and a molecular weight distribution $M_w/M_n$ of at least 2.5.

The present invention further provides a process for producing nonwovens and laminates using the fibers of the present invention.

DETAILED DESCRIPTION OF THE INVENTION

For the purposes of the present invention the terms "fiber" and "filament" may be used interchangeably.

The polypropylene fibers of the present invention are produced by methods well known to the skilled person. Polypropylene is melted in an extruder, in general passed through a melt pump to ensure a constant feeding rate and then extruded through a number of fine capillaries of a spinneret. The still molten fibers are simultaneously cooled by air, drawn to a final diameter and collected. Optionally, the so-obtained fibers may be subjected to a further drawing step. They are for example collected on a winder or other suitable collecting means.

For the purposes of the present invention, it is, however, preferred that the fibers be as-spun, i.e. that, no further drawing step is conducted with the fibers.

The nonwovens of the present invention may be produced by any suitable method. The preferred methods are the spunbonding process and the melt blown process. Of these the spunbonding process is the most preferred. In the spunbonding process as well as the melt blown process the extruded fibers are drawn in the molten state only. For the purposes of the present invention the fibers comprised in a spunbond nonwoven or a melt blown nonwoven can therefore considered to be as-spun fibers.

In the spunbonding process polypropylene is melted in an extruder, in general first passed through a melt pump to ensure a constant feeding rate and then extruded from a number of fine, usually circular, capillaries of a spinneret, thus obtaining filaments. The filament formation can either be done by using one single spinneret with a large number of holes, generally several thousand, or by using several smaller spinnerets with a correspondingly lower number of holes per spinneret. After exiting from the spinneret, the still molten filaments are quenched by a current of air. The diameter of the filaments is then quickly reduced by a flow of high-velocity air. Air velocities in this drawdown step can range, up to several thousands of meters per minute.

Irrespective of which process is used for the production of the fibers or nonwovens, the melt-extruding is preferably done at a melt temperature in the range from 230° C. to 260° C.

After drawdown the filaments are collected on a support, for example a forming wire or a porous forming belt, thus first forming an unbonded web, which is then passed through compaction rolls and finally through a bonding step. Bonding of the fabric may be accomplished by thermobonding, hydroentanglement, needle punching, or chemical bonding.

In the melt blown process the polypropylene is melted in an extruder, in general first passed through a melt pump to ensure a constant feeding rate and then through the capillaries of a special melt blowing die. Usually melt blowing dies have a single line of usually circular capillaries through which the molten polymer passes. After exiting from the die, the still molten filaments are contacted with hot air at high speed, which rapidly draws the fibers and, in combination with cool air, solidifies the filaments. In the following, the nonwoven is formed by depositing the filaments directly onto a forming wire or a porous forming belt.

The fibers of the present invention may be multicomponent fibers. Preferably they are bicomponent fibers. Bi- or multi-component fibers are known in many different configurations, such as for example side-by-side, sheath-core, islands-in-the-sea, pie or stripe configurations. Bi- or multi-component fibers can be formed by co-extrusion of at least two different components into one fiber or filament. This is done by feeding the different components to a corresponding number of extruders and combining the different melts into a single fiber or filament. The resulting fiber or filament has at least two different essentially continuous polymer phases. Such fibers, their production as well as their forming a nonwoven, are well known to the skilled person and are for example described in F. Fourné, Synthetische Fasern, Carl Hanser Verlag, 1995, chapter 5.2 or in B. C. Goswami et al., Textile Yarns, John Wiley & Sons, 1977, p. 371-376.

Composites may be formed from two or more nonwovens, of which at least one is made in accordance with the present invention. In particular, the composites comprise a spunbond nonwoven layer (S) according to the present invention or a melt blown nonwoven layer (M) according to the present invention. Composites in accordance with the present invention can for example be SS, SSS, SMS, SMMSS or any other combination of spunbond and melt blown nonwoven layers.

A first nonwoven or composite, said first nonwoven or composite being in accordance with the present invention, and a film may be combined to form a laminate. The film preferably is a polyolefin film. The laminate is formed by bringing the first nonwoven or composite and the film together and laminating them to one another for example by passing them through a pair of lamination rolls. The laminates may further include a second nonwoven or composite, which can be but need not be according to the present invention, on the face of the film opposite to that of the first nonwoven or composite. In a preferred embodiment, the film of the laminate is a breathable polyolefin film, thus resulting in a laminate with breathable properties.

For the present invention it is essential that the polypropylene is a metallocene polypropylene, i.e. it is produced by a metallocene-based catalytic system. The polymerization of propylene and one or more comonomers is performed with one or more metallocene-based catalytic systems comprising one or more metallocenes, a support and an activating agent. Such catalytic systems are commercially available and thus known to the person skilled in the art.

Further, it is essential that the metallocene polypropylene used in the present invention is a random copolymer of propylene with one or more comonomers i.e. that the metallocene polypropylene is a metallocene random copolymer, with said comonomer being ethylene or a $C_4$-$C_{10}$ alpha-olefin, such as butene-1, pentene-1, hexene-1, octene-1, 4-methyl-pentene-1. The preferred comonomers are ethylene and butene-1. The most preferred comonomer is ethylene.

For the present invention it is essential that the comonomer content of the metallocene random copolymer used in the present invention be in the range from 0.1 wt % to 1.0 wt %, preferably in the range from 0.2 wt % to 0.8 wt %, even more preferably in the range from 0.3 wt % to 0.8 wt %, and most preferably in the range from 0.4 wt % to 0.8 wt %, relative to the total weight of the metallocene random copolymer.

A comonomer content below 0.1 wt % does not have any effect on the bonding properties as compared to a metallocene propylene homopolymer. A comonomer content above 1.0 wt % leads to a drastic loss in mechanical properties of the fibers, and in particular as-spun fibers, and, in consequence, of the nonwovens produced with these fibers. This loss in mechanical properties is even more surprising in light of the improved bonding properties of the fibers, and in particular as-spun fibers according to the present invention. Apparently, the loss in strength due to the higher comonomer content outweighs any improvement in bonding properties. Thus, it has been surprisingly found that fibers, and in particular as-spun fibers, comprising a metallocene random copolymer with the above-mentioned comonomer content combine good bonding properties, in particular a reduction of the bonding temperature, at which maximum tenacity in the resulting nonwoven is found, with acceptable mechanical properties.

Further, it is essential that the metallocene polypropylene used in the present invention has a molecular weight distribution (MWD), characterized by the ratio $M_w/M_n$, i.e. the ratio of weight average molecular weight $M_w$ over number average molecular weight $M_n$, of at least 2.5, preferably of at least 2.75, more preferably of at least 3.0, even more preferably of at least 3.5 and most preferably of at least 4.0. Preferably the molecular weight distribution, $M_w/M_n$, is at most 7.0, preferably at most 6.5 and most preferably at most 6.0. Molecular weights can be determined by size exclusion chromatograph (SEC) as described in the examples.

The metallocene component used to prepare the metallocene polypropylene can be any bridged metallocene known in the art. Preferably it is a metallocene represented by the following general formula.

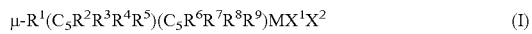
$$\mu\text{-}R^1(C_5R^2R^3R^4R^5)(C_5R^6R^7R^8R^9)MX^1X^2 \qquad (I)$$

wherein
the bridge $R^1$ is —$(CR^{10}R^{11})_p$— or —$(SiR^{10}R^{11})_p$— with $p=1$ or 2, preferably it is —$(SiR^{10}R^{11})$—;
M is a metal selected from Ti, Zr and Hf, preferably it is Zr;
$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl;
$R^2$, $R^3$, $R^4$, $R^5$, $R^6$, $R^7$, $R^8$, $R^9$, $R^{10}$ and $R^{11}$ are each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each $R^2$, $R^3$, $R^4$, $R^5$, $R^6$, $R^7$, $R^8$, $R^9$, $R^{10}$ and $R^{11}$ may in turn be substituted in the same way.

The preferred metallocene components are represented by the general formula (I), wherein
the bridge $R^1$ is $SiR^{10}R^{11}$;
M is Zr;
$X^1$ and $X^2$ are independently selected from the group consisting of halogen, hydrogen, and $C_1$-$C_{10}$ alkyl; and $(C_5R^2R^3R^4R^5)$ and $(C_5R^6R^7R^8R^9)$ are indenyl of the general formula $C_9R^{12}R^{13}R^{14}R^{15}R^{16}R^{17}R^{18}R^{19}$, wherein $R^{12}$, $R^{13}$, $R^{14}$, $R^{15}$, $R^{16}$, $R^{17}$, $R^{18}$ and $R^{19}$ are each independently selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring;
$R^{10}$ and $R^{11}$ are each independently selected from the group consisting of $C_1$-$C_{10}$ alkyl, $C_5$-$C_7$ cycloalkyl, and $C_6$-$C_{15}$ aryl, or $R^{10}$ and $R^{11}$ may form a cyclic saturated or non-saturated $C_4$-$C_{10}$ ring; and
each $R^{10}$, $R^{11}$, $R^{12}$, $R^{13}$, $R^{14}$, $R^{15}$, $R^{16}$, $R^{17}$, $R^{18}$ and $R^{19}$ may in turn be substituted in the same way.

Particularly suitable metallocenes are those having $C_2$-symmetry.

Examples of particularly suitable metallocenes are:
dimethylsilanediyl-bis(cyclopentadienyl)zirconium dichloride,
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride,
dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
ethylene-bis(indenyl)zirconium dichloride,
ethylene-bis(tetrahydroindenyl)zirconium dichloride,
isopropylidene-(3-tert-butyl-5-methyl-cyclopentadienyl) (fluorenyl)zirconium dichloride.

The metallocene may be supported according to any method known in the art. In the event it is supported, the support used in the present invention can be any organic or inorganic solid, particularly porous supports such as talc, inorganic oxides, and resinous support material such as polyolefin. Preferably, the support material is an inorganic oxide in its finely divided form.

The polymerization of propylene and one or more comonomers in presence of a metallocene-based catalytic system can be carried out according to known techniques in one or more polymerization reactors. The metallocene polypropylene used in the present invention is preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence the melt flow of the metallocene polypropylene, is regulated by the addition of hydrogen to the polymerization medium.

While metallocene polypropylene in general has a molecular weight distribution $M_w/M_n$ of around 2, the metallocene polypropylene used in the present invention is characterized by a broader molecular weight distribution as indicated above. Such a broader molecular weight distribution can be produced either by choosing a metallocene as component of the catalytic system, with the provision that said metallocene is one that naturally produces polypropylene with a larger molecular weight distribution. Suitable metallocenes can for example be found in L. Resconi et al., *Chem. Rev.*, 2000, 100, (4), pp 1253-1346. Alternatively, it is possible to use a blend of two metallocenes, each characterized in having a different response to hydrogen, thus under the same polymerization conditions producing polypropylenes of different molecular weight, which results in a broader molecular weight distribution for the resulting overall polypropylene. Further, and this is the preferred method, it is possible to produce such a metallocene polypropylene having a broader molecular weight distribution by consecutive polymerization of propylene and one or more optional comonomers in two or more serially connected polymerization reactors, each having a different hydrogen concentration, so as to produce polypropylenes of different molecular weight in each reactor, thus resulting in a broader molecular weight distribution for the overall polypropylene produced in such a system of serially connected polymerization reactors. While it is clear to the skilled person that two, three, four or even five polymerization reactors might be used, it is preferred to use two or three polymerization reactors, with two being the most preferred.

The metallocene polypropylene used in the present invention is characterized by a melt flow index in the range from 1 to 2000 dg/min (as measured according to ISO 1133, condition L, at 230° C. under 2.16 kg). When used for fiber spinning the melt flow of the metallocene polypropylene is in the range from 5 dg/min to 40 dg/min. When used in the spunbonding process the melt flow of the metallocene polypropylene is at least 10 dg/min, preferably at least 12, 14, 16, 18 or 20 dg/min. When used in the spunbonding process the melt flow of the metallocene polypropylene is at most 300 dg/min, preferably at most 200 dg/min, more preferably at most 150 dg/min, even more preferably at most 100 dg/min and most preferably at most 60 dg/min. When used in the melt blown process the melt flow of the metallocene polypropylene is at least 100 dg/min, preferably at least 150 dg/min, more preferably at least 200 dg/min, even more preferably at least 250 dg/min and most preferably at least 300 dg/min. When used in the melt blown process the melt flow of the metallocene polypropylene is at most 2000 dg/min, preferably at most 1800 dg/min, more preferably at most 1600 dg/min, and most preferably at most 1400 dg/min.

Preferably, the metallocene polypropylene used in the present invention is characterized by a high isotacticity, for which the content of mmmm pentads is a measure. The content of mmmm pentads is at least 90%, preferably at least 95%, 96% or 97%. The isotacticity is determined by $^{13}$C-NMR analysis as described in the examples.

Preferably, the metallocene polypropylene used in the present invention is characterized by a melting temperature of at least 140° C. More preferably, it is characterized by a melting temperature of at least 145° C. and most preferably of at least 147° C. The determination of melting temperatures is well known to the person skilled in the art. Generally, in order to erase the thermal history of the samples, they are first heated to a temperature above the melting temperature, e.g. to 200° C., and kept there for a certain time, e.g. for 3 minutes. After cooling the samples are then reheated for the measurement of the melting temperature. For the determination of the melting temperature the heating and cooling rate is 20° C./min.

For the purposes of the present invention the metallocene polypropylene preferably is characterized by a percentage of 2,1-insertions relative to the total number of propylene molecules in the polymer chain of at least 0.5%, more preferably of at least 0.6% and most preferably of at least 0.7%. The metallocene polypropylene of the present invention is preferably characterized by a percentage of 2,1-insertions relative to the total number of propylene molecules in the polymer chain of at most 1.2%, more preferably of at most 1.1%, and most preferably of at most 1.0%. A detailed description of the method is given in, the examples.

Preferably, the metallocene polypropylene used in the present invention comprises a nucleating agent. For the purposes of the present invention we define a nucleating agent as a chemical compound that raises the crystallization temperature of the metallocene polypropylene.

Suitable nucleating agents for use in the present invention can be selected from any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these.

Examples for carboxylate salts are organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo [2.2.1]heptane dicarboxylic acid salt. A nucleating agent of this type is sold as HYPERFORM® HPN-68 by Milliken Chemical.

Examples for sorbitol acetals are dibenzylidene sorbitol (DBS), bis(p-methyl-dibenzylidene sorbitol) (MDBS), bis (p-ethyl-dibenzylidene sorbitol) and bis(3,4-dimethyl-dibenzylidene sorbitol) (DMDBS). Bis(3,4-dimethyl-dibenzylidene sorbitol) (DMDBS) is preferred. These can for example be obtained from Milliken Chemical under the trade names of Millad 3905, Millad 3940 and Millad 3988.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula (I)

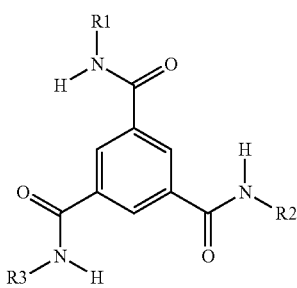

wherein R1, R2 and R3, independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, iso-pentyl, 1,1-dimethylpropyl, 1,2-dimethylpropyl, 3-methyl-butyl, hexyl, heptyl, octyl or 1,1,3,3-tetramethylbutyl. Examples for $C_5$-$C_{12}$ cycloalkyl are cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the metallocene random copolymer of propylene and one or more comonomers. In physical blending the polymeric nucleating agent containing vinyl compounds is mixed with the metallocene random copolymer of propylene and one or more comonomers in an extruder or in a blender. In chemical blending the metallocene random copolymer of propylene and one or more comonomers comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cylcopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further examples of polymeric nucleating agents are poly-3-methyl-1-butene, polydimethylstyrene, polysilanes and polyalkylxylenes. As explained for the polymeric nucleating agents containing vinyl compounds, these polymeric nucleating agents can be introduced into the metallocene polypropylene either by chemical or by physical blending.

It is also possible to use high-density polyethylene, such as for example Rigidex HD6070EA, available from INEOS Polyolefins, or a polypropylene having a fractional melt flow, or a polypropylene that comprises a fraction of fractional melt flow.

Further, it is possible to use blends of nucleating agents, such as for example a blend of talc and a phosphate ester salt or a blend of talc and a polymeric nucleating agent containing vinyl compounds.

The nucleating agent may be introduced into the metallocene polypropylene by blending it with a nucleating agent, which is either in pure form or in form of a masterbatch, for example by dry-blending or by melt-blending. It is within the scope of the present invention that the nucleating agent can be introduced into the metallocene polypropylene by blending it with a nucleated thermoplastic polymer, wherein said thermoplastic polymer is different from the metallocene polypropylene While it is clear to the skilled person that the amount of nucleating agent to be added depends upon its crystallization efficiency, for the purposes of the present invention the nucleating agent or the blend of nucleating agents—if comprised at all—is present in the metallocene polypropylene in an amount of at least 50 ppm, preferably at least 100 ppm. It is present in an amount of at most 5000 ppm, preferably of at most 4000 ppm, even more preferably of at most 3000 ppm and most preferably of at most 2000 ppm.

Preferably, the nucleated metallocene polypropylene, i.e. the metallocene polypropylene comprising a nucleating agent, used in the present invention has a crystallization temperature that is at least 3° C. higher than the crystallization temperature of the respective non-nucleated metallocene polypropylene. More preferably, the crystallization temperature of the nucleated metallocene polypropylene is at least 4° C., 5° C.; 6° C., 7° C., 8° C., 9° C. or 10° C. higher than the crystallization temperature of the respective non-nucleated metallocene polypropylene.

The fibers of the present invention consist of one, two or more components, so as to form mono-, bi- or multi-component fibers, which may in turn be comprised in nonwovens. Each of the components may in turn comprise one or more constituents, i.e. the components may be blends. Said constituents are selected from thermoplastic polymers, such as polyethylene, Ziegler-Natta polypropylene or metallocene polypropylene with the provision that at least one of the constituents comprises a metallocene polypropylene as required by the present invention. The metallocene polypropylene is preferably comprised in a component that at least partially forms the surface of the multi-component fibers and filaments. Most preferably the component comprising the metallocene polypropylene forms the entire surface of the multi-component fibers and filaments. For the percentage of said metallocene polypropylene in a component, it is preferred that said metallocene polypropylene is comprised in at least 50% by weight of at least one of the components of the fibers and filaments of the present invention, more preferably in at least 60, 70, 80, 90, 95 or 99% by weight based on the weight of the respective component.

The polypropylene fibers of the present invention can be used in carpets, woven textiles, and nonwovens.

The nonwovens made in accordance with the present invention preferably have a basis weight in the range from 1 g/m² to 200 g/m², more preferably in the range from 5 g/m² to 100 g/m² and most preferably in the range from 7 g/m² to 30 g/m².

The polypropylene spunbond nonwovens of the present invention as well as composites or laminates comprising it can be used for hygiene and sanitary products, such as for example diapers, feminine hygiene products and incontinence products, products for construction and agricultural applications, medical drapes and gowns, protective wear, lab coats etc.

The polypropylene meltblown nonwovens of the present invention can be used in hygiene, filtration and absorption applications, such as diapers, feminine hygiene products, incontinence products, wraps, gowns, masks, filters, absorption pads etc. Frequently polypropylene meltblown nonwovens are used in combination with other nonwovens, such as for example spunbond nonwovens to form composites, which in turn may be used in the cited applications.

EXAMPLES

Test Methods

The melt flow index was measured according to norm ISO 1133, condition L, using a weight of 2.16 kg and a temperature of 230° C.

Molecular weights are determined by Size Exclusion Chromatography (SEC) at high temperature (145° C.). A 10 mg PP sample is dissolved at 160° C. in 10 ml of trichlorobenzene (technical grade) for 1 hour. The analytical conditions for the Alliance GPCV 2000 from WATERS are:
  Volume: +/−400 µl
  Injector temperature: 140° C.
  Column and detector: 145° C.
  Column set: 2 Shodex AT-806MS and 1 Styragel HT6E
  Flow rate 1 ml/min
  Detector: Refractive index
  Calibration: Narrow standards of polystyrene
  Calculation: Based on Mark-Houwink relation $(\log(M_{PP})=\log(M_{PS})-0.25323)$ The $^{13}$C-NMR analysis is performed using a 400 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 4000 scans per spectrum, a pulse repetition delay of 20 seconds and a spectral width of 26000 Hz. The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg of polymer are dissolved in 2.0 ml of TCB, followed by addition of 0.5 ml of $C_6D_6$ and 2 to 3 drops of HMDS.

Following data acquisition the chemical shifts are referenced to the signal of the internal standard HMDS, which is assigned a value of 2.03 ppm.

The isotacticity is determined by $^{13}$C-NMR analysis on the total polymer. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad a correction is performed for its overlap with a methyl signal related to 2,1-insertions. The percentage of mmmm pentads is then calculated according to % $mmmm=AREA_{mmmm}/(AREA_{mmmm}+AREA_{mmmr}+AREA_{mmrr}+AREA_{mrrm})\cdot 100$ Determination of the percentage of 2,1-insertions for a metallocene propylene homopolymer. The signals corresponding to the 2,1-insertions are identified with the aid of published data, for example H. N. Cheng, J. Ewen, Makromol. Chem., vol. 190 (1989), pages 1931-1940. A first area, AREA1, is defined as the average area of the signals corresponding to 2,1-insertions. A second area, AREA2, is defined as the average area of the signals corresponding to 1,2-insertions. The assignment of the signals relating to the 1,2-insertions is well known to the skilled person and need not be explained further. The percentage of 2,1-insertions is calculated according to 2,1-insertions(in %)=AREA1/(AREA1+AREA2)·100 with the percentage in 2,1-insertions being given as the molar percentage of 2,1-inserted propylene with respect to total propylene.

The determination of the percentage of 2,1-insertions for a metallocene random copolymer of propylene and ethylene is determined by two contributions:
  (i) the percentage of 2,1-insertions as defined above for the propylene homopolymer, and
  (ii) the percentage of 2,1-insertions, wherein the 2,1-inserted propylene neighbors an ethylene,
thus the total percentage of 2,1-insertions corresponds to the sum of these two contributions. The assignments of the signal for case (ii) can be done either by using reference spectra or by referring to the published literature.

The ethylene content of a metallocene random copolymer can be determined by $^{13}$C-NMR as the sum of
  (i) the percentage of ethylene as determined following the procedure described by G. J. Ray et al. in Macromolecules, vol. 10, n° 4, 1977, p. 773-778, and
  (ii) the percentage of ethylene wherein the ethylene neighbors a 2,1-inserted propylene (see above).

Fiber tenacity and elongation were measured on a Lenzing Vibrodyn according to norm ISO 5079:1995 with a testing speed of 10 mm/min.

Tensile strength and elongation of the nonwovens were measured according to ISO 9073-3:1989.

Melting temperatures were measured on a DSC 2690 instrument by TA Instruments. To erase the thermal history the samples were first heated to 200° C. and kept at 200° C. for a period of 3 minutes. The reported melting temperatures were then determined with heating and cooling rates of 20° C./min.

Polypropylenes

In order to illustrate the advantages of the present invention three polypropylenes were selected, of which two served as comparative examples either because their molecular weight distribution or their ethylene content were outside of the ranges required by the present invention. Their properties are indicated in table 1.

TABLE 1

|  |  | Example 1 | Comp. ex. 1 | Comp. ex. 2 |
| --- | --- | --- | --- | --- |
| MFI | dg/min | 25.1 | 24.9 | 30.6 |
| GPC |  |  |  |  |
| Mn | kDa | 54 | 59 | 49 |
| Mw | kDa | 169 | 165 | 151 |
| Mz | kDa | 334 | 302 | 301 |
| D |  | 3.1 | 2.8 | 3.1 |
| DSC |  |  |  |  |
| $T_m$ | ° C. | 150 | 152 | 136 |
| NMR |  |  |  |  |
| C2 | wt % | 0.4 | 0 | 2.0 |
| 2,1-insertions | % | 0.9 | 0.8 | 0.8 |

The polypropylenes of example 1 and comparative example 2 were produced on a pilot line with two serially connected 150 l loop reactors under standard polymerization conditions using a metallocene-based catalyst with a dimethylsilyl-bridged bis(indenyl)zirconium dichloride derivative as metallocene component. Propylene, hydrogen, and—if present—ethylene, were added continuously to the two reactors. In order to obtain metallocene polypropylenes having a broader molecular weight distribution than normally, the hydrogen concentration in the two reactors was different so as to produce polypropylenes of different molecular weight in the two reactors. The targeted melt flow in the first reactor and the final melt flow of the polypropylene obtained after the second reactor are indicated in table 2. The polypropylene of comparative example 1 is a commercial metallocene polypropylene produced in a commercial large-scale production plant with two serially connected loop reactors under standard polymerization conditions using a metallocene-based catalyst with a dimethylsilyl-bridged bis(indenyl)zirconium dichloride derivative as metallocene component. PP3 is produced in such a way that the melt flow indices of the polypropylenes produced in each reactor are identical and basically correspond to the final melt flow index.

All polypropylenes were additivated with a sufficient amount of antioxidants and acid scavengers to reduce their degradation during processing.

TABLE 2

|  |  | Example 1 | Comp. ex. 1 | Comp. ex. 2 |
|---|---|---|---|---|
| MFI in first reactor | dg/min | 17.2 | 25.0 | n.a. |
| Final MFI (pellets) | dg/min | 25.1 | 24.9 | 30.6 |

Fiber Spinning

The polypropylenes of example 1 and comparative examples 1 and 2 were spun into fibers on a Busschaert pilot line equipped with two circular dies of 112 holes each of a diameter of 0.5 mm. The melt temperature was kept at 250° C. Throughput per hole was kept constant at 0.5 g/hole/min. Take-up speed was kept at 1700 m/min. No additional drawing step was performed. Properties of the obtained as-spun fibers are given in table 3.

TABLE 3

|  |  | Example 1 | Comp. ex. 1 | Comp. ex. 2 |
|---|---|---|---|---|
| Titer | dtex | 2.9 | 2.9 | n.a. |
| Tenacity at max | cN/tex | 22.5 | 25.5 | n.a. |
| Elongation at break | % | 209 | 198 | n.a. |

The results on as-spun fibers made according to the present invention show elongational properties that are superior to those of the comparative fibers. Thus, the new fibers are well suited for applications where more elongation is required.

Spunbonded Nonwoven

The polypropylenes of example 1 and comparative examples 1 and 2 were used to produce spunbond nonwovens on a 1.1 m wide Reicofil 4 line with a single beam having about 6800 holes per meter length, the holes having a diameter of 0.5 mm. Line speed was kept at 300 m/min. The nonwovens had a fabric weight of 12 g/m². The nonwovens were thermally bonded using an embossed roll. Further processing conditions are given in table 4. The calender temperatures reported in table 4 are the bonding temperatures at which the highest values for max tensile strength were obtained. The calender temperatures were measured on the embossed roll using a contact thermocouple. Properties of the so-obtained nonwovens are given in table 5, with MD denoting "machine direction" and CD "cross direction".

TABLE 4

|  |  | Example 1 | Comp. ex. 1 | Comp. ex. 2 |
|---|---|---|---|---|
| Melt temp. at the die | ° C. | 250 | 250 | 250 |
| Throughput per hole | g/hole/min | 0.41 | 0.41 | 0.41 |
| Cabin pressure | Pa | 8000 | 8000 | 8000 |
| Calender temp. for max. tensile strength | ° C. | 138 | 145 | 121 |

TABLE 5

|  |  | Example 1 | Comp. ex. 1 | Comp. ex. 2 |
|---|---|---|---|---|
| Filament titer | dtex | 1.11 | 1.06 | 1.33 |
| Tensile strength @ max |  |  |  |  |
| MD | N/5 cm | 32.9 | 35.7 | 19.0 |
| CD | N/5 cm | 15.2 | 17.0 | 10.9 |
| Elongation |  |  |  |  |
| MD | % | 63 | 60 | 51 |
| CD | % | 70 | 55 | 63 |

The metallocene polypropylene of example 1 showed a surprising behavior when used in the production of spunbonded nonwovens. In comparison to the commercial metallocene polypropylene of comparative example 1 the metallocene polypropylene of example 1 permitted to significantly decrease the calender temperatures, thus reducing the overall energy consumption of the spunbonding process. At the same time the level of tensile strength remained on a level comparable to that of the commercial metallocene polypropylene of comparative example 1. However, very surprisingly, the spunbonded nonwoven of example 1 had significant increases in elongational behavior in the cross direction. As a result, the metallocenes polypropylenes used in the present invention allow for the production of spunbonded nonwovens that have improved elongational properties, in particular improved balance between the elongation properties in machine direction and in cross-direction.

What is claimed is:

1. Fibers comprising only one polypropylene, wherein the polypropylene is a metallocene random copolymer of propylene and one or more comonomers, said comonomers being alpha-olefins different from propylene, wherein the metallocene random copolymer has a comonomer content of from 0.1 wt. % to 1.0 wt. % relative to a total weight of the metallocene random copolymer, a melting temperature of at least 147° C., an isotacticity of at least 90% mmmm pentads content as measured by $^{13}$C-NMR, a percentage of 2,1-insertions relative to the total number of propylene molecules in the polymer chain of at most 1.0%, and a molecular weight distribution Mw/Mn of between 4.0 and 6.0, and wherein the fibers are as-spun fibers.

2. A nonwoven comprising the fibers of claim 1.

3. The nonwoven of claim 2, wherein the nonwoven is a spunbond nonwoven.

4. A laminate comprising the nonwoven of 2.

5. As-spun fibers comprising only one polypropylene, wherein the polypropylene is a metallocene random copolymer of propylene and a comonomer, said comonomer being butene, wherein the metallocene random copolymer has a comonomer content of from 0.1 wt. % to 1.0 wt. % relative to a total weight of the metallocene random copolymer, a melting temperature of at least 147° C., an isotacticity of at least 90% mmmm pentads content as measured by $^{13}$C-NMR, a percentage of 2,1-insertions relative to the total number of propylene molecules in the polymer chain of at least 0.7% and less than 1.2%, and a molecular weight distribution Mw/Mn of at least 2.5.

6. The fibers of claim 5, wherein the metallocene random copolymer has a molecular weight distribution Mw/Mn of at least 4.0.

7. The fibers of claim 5, wherein the metallocene random copolymer has a comonomer content of from 0.4 wt. % to 0.8 wt. % relative to a total weight of the metallocene random copolymer, an isotacticity of at least 97% mmmm pentads content, a percentage of 2,1-insertions relative to the total number of propylene molecules in the polymer chain of at least 0.7% and at most 1.0, and a molecular weight distribution Mw/Mn of at least 4.0 and at most 6.0.

\* \* \* \* \*